Patented Dec. 5, 1933

1,937,822

UNITED STATES PATENT OFFICE 1,937,822

BENEFICIATION OF ORES

Arthur J. Jones, Iron Mountain, Mich.

Application September 12, 1931
Serial No. 562,500

2 Claims. (Cl. 75—14)

This invention relates broadly to the beneficiation of metal bearing ores. It relates to a process and apparatus for the beneficiation of ore, such, for example, as iron ore, through which improved results and higher economies are obtained.

In certain of its more specific aspects, the invention relates to the beneficiation of banded iron ore to produce sponge iron. Still more specifically, it relates to the production of partly reduced sponge iron in porous lump form from banded iron ore.

The invention further relates to apparatus for reducing or partly reducing metal bearing ores, which is designed to operate at a high degree of thermal efficiency and to effect the reduction of the ores in such manner as to produce a product of superior quality.

Processes and apparatus for the beneficiation of metal bearing ores have been well known for many years. Such processes and apparatus have, generally speaking, been attended with numerous serious disadvantages. High thermal efficiencies have been difficult or impossible of attainment by reason of undesirable endothermic reactions in the treating chamber and by reason of the dissipation of unburned gases and volatile matter. Great difficulty has been encountered through sticking of the charge on the lining of the treating chamber. Difficulty has been experienced in producing sponge iron sufficiently free from sulphur to be suitable for desired commercial uses.

It has been usual in the beneficiation of ores to utilize inclined rotary kilns. The ore and carbonaceous material, such, for example, as coal, have usually been fed in at the upper end of the kiln, rotation thereof causing progressive downward movement of the mixed ore and coal. It has been customary to provide means for creating an updraft in the kiln, that is to say, a draft opposite in direction to the advance of the mixed ore and coal. Such provision has, in my opinion, been responsible for many of the drawbacks and disadvantages heretofore encountered in the beneficiation of ore.

Particularly in the beneficiation of banded ores, such as banded iron ore, high operating and thermal efficiencies have not been obtained, for one reason because it has been customary to crush or disintegrate the iron strata and gangue strata to produce a more or less homogeneous mixture of ore and gangue, thereby not only entailing an additional mechanical operation, but also increasing the amount of heat needed in the beneficiation process.

I provide a process and apparatus for the beneficiation of ore designed to overcome the disadvantages above pointed out.

I provide a process of beneficiation of banded iron ore, comprising heating the ore, and separating the iron strata from the gangue while maintaining the iron strata in substantially uncrushed condition.

I also provide a process of beneficiation of iron ore, comprising heating the ore, advancing a reducing agent in contact with the ore, and creating a draft in the direction of advance of the reducing agent. I further provide a process of beneficiation of iron ore, comprising advancing ore through a preheating zone and a reducing zone, and creating a draft in the direction of advance of the ore.

I still further provide a process of beneficiation or iron ore, comprising supplying to the ore a reducing agent in quantity insufficient to fully reduce the ore but sufficient to create a reducing atmosphere, the ore containing an excess of oxygen preventing contamination of the iron by impurities, such as sulphur, which may be present.

I also provide apparatus for the beneficiation of iron ore, comprising a chamber through which the ore is adapted to be advanced, and means for creating a draft through said chamber in the direction of advance of the ore.

Other objects and advantages of the invention will become apparent as the following description of a present preferred embodiment thereof proceeds.

In the accompanying drawing I have shown diagrammatically a present preferred form of apparatus suitable for carrying out the invention.

Inasmuch as the invention in certain of its more specific aspects is particularly useful in the beneficiation of banded iron ore, and especially the production of partly reduced sponge iron in porous lump form from banded iron ore, the invention will be described for purposes of illustration only as embodied in a process and apparatus for the beneficiation of banded iron ore, particularly to form partly reduced sponge iron, it being prefaced, however, that the invention is nowise so limited, but is of general application in the beneficiation of metal bearing ores.

Banded iron ore is ore comprising intermingled strata, layers or masses of relatively pure iron ore and earthy substances, such as silica, alu-

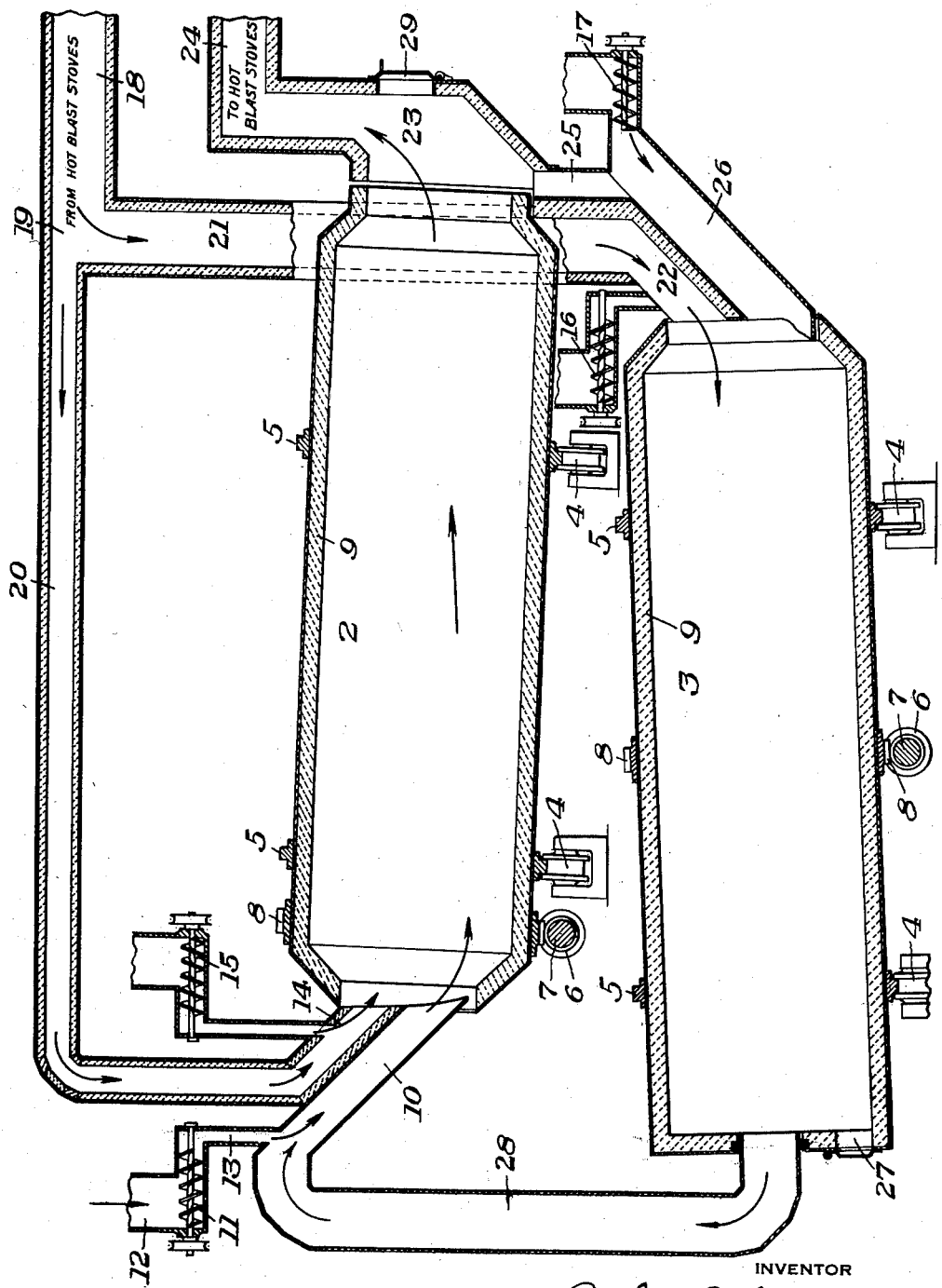

actions in the preheating kiln proceed toward complete combustion, such reactions are exothermic, that is to say, they produce or give out heat in contradistinction to endothermic reactions which absorb heat.

The preheated charge passes from the preheating kiln through the passage 25 and into the metallizing kiln through the chute 26. In the metallizing kiln the charge, comprising for the most part the heated ore, is mixed with coal delivered at 17. Upon mixing of the heated ore and coal an endothermic reaction takes place. Such reaction is a distillation of the volatile matter from the coal by the heat stored in the ore. The charge thence passing downwardly within the metallizing kiln comprises in large measure heated ore and solid carbon. To compensate for the heat absorbed by the endothermic reactions and loss of heat by radiation and leakage, a small amount of heated air and coal are admitted through chute 22. Combustion occurs and the gases thereby produced are enriched by the volatile matter distilled from the coal. The resultant gas mixture will not oxidize the sponge iron or solid carbon moving downwardly within the metallizing kiln.

Reaction takes place in the metallizing kiln between the oxygen in the ore and the carbon in the charge. The degree of reduction desired in the ultimate sponge iron product is determined largely by the amount of coal introduced by the feed mechanism 17 through the chute 26. In the production of partly reduced sponge iron an amount of coal insufficient to completely deoxidize the ore is introduced, and by the time the charge has reached the bottom of the metallizing kiln substantially all of the carbon in the charge has been oxidized. The sponge iron withdrawn through the outlet opening 27 is in such case partly reduced sponge iron in porous lump form comprising lumps each having an outer shell or covering of substantially reduced iron and an inner core of relatively unreduced iron strata. The gases at the bottom of the metallizing kiln contain considerable sensible heat as well as a substantial amount of oxidizable matter, and such gases are therefore returned to assist in preheating the ore in the preheating kiln.

If instead of partly reduced sponge iron, fully reduced sponge iron is desired, the charge may be maintained in the metallizing kiln for a longer period and the amount of coal or carbonaceous material introduced thereinto is increased. In order to produce fully reduced sponge iron, there should be an excess of carbonaceous material in the metallizing kiln so as to insure deoxidizing all of the ore and prevent reoxidization.

When there is not an excess of carbonaceous material in the metallizing kiln but rather an excess of oxygen in the core of the sponge iron, such oxygen prevents contamination of the iron by sulphur even though a reducing condition is maintained in the metallizing kiln. Any sulphur tending to attack the iron combines with the oxygen in the product and passes off as sulphur dioxide.

The utilization of a down draft in the preheating and metallizing kilns in contradistinction to an up draft enables the attainment of several advantages. In an up draft kiln the volatile matter from the coal which is mixed and charged with the ore is distilled therefrom at such low temperatures that the ore is not hot enough for rapid reduction, and even though the volatile matter may enrich the gases above the charge, the ore is not hot enough at this time to receive any great benefit. Furthermore, when no provision is made to utilize the gases, their escape, laden as they are both with sensible heat and oxidizable material, represents a waste. Even the use of such gases for producing heat elsewhere decreases the efficiency of the beneficiation process.

Furthermore, in order to protect the sponge iron from the excessively oxidizing heating flame in the discharge end of an up draft kiln it is necessary to introduce a large excess of coal in the charge over and above the amount required for reduction of the ore, thereby causing contamination of the iron by the sulphur in the coal. Another serious disadvantage of the up draft kiln is the tendency of the charge to stick to the lining at the point where the highest temperature occurs. The ore and the heating flame make contact when both are at their highest temperature, causing fusion of the ore and consequent sticking of it to the lining of the kiln. This disadvantage has proven to be one of the utmost seriousness and has caused no end of trouble with up draft kilns. This is particularly true when kilns of the larger sizes are used which may approach or exceed 100 feet in length. In such kilns the charge fuses and adheres to the lining too far from either end of the kiln to be removed by mechanical means, and it is usually necessary to shut down the kiln, cut out the lining and reline the kiln before it can be used further.

All of the disadvantages above mentioned are done away with by utilization of a down draft. In a down draft kiln the gases and volatile matter travel in the same direction as the charge. They mix with and enrich the heating flame so that it is not oxidizing to the sponge iron or fuel in the charge. The gases after leaving the metallizing kiln are not wasted but substantially their entire thermal content is made use of in the preheating kiln.

As above mentioned, it is desirable to maintain an oxidizing condition in the preheating kiln. In the metallizing kiln the iron ore is not oxidized, as no reduction takes place until the volatile matter has first been driven off from the coal which is introduced. Such volatile matter enriches the heating flame as the reaction between the carbon remaining in the coal and the oxygen in the ore begins; and the heating flame will not oxidize either the sponge iron or the carbon in the charge. Furthermore, on account of the enrichment of the heating flame by the volatile matter from the coal, less coal is required than in an up draft kiln. When only partly reduced sponge iron is produced, the fuel requirement is further greatly reduced. As above stated, the excess of oxygen in the ore when partly reduced sponge iron is formed prevents contamination of the iron by sulphur.

In the down draft kiln the hot flame comes in contact with the cold ore. This lowers the temperature of the flame so that by the time the ore has been raised to the proper temperature for rapid reduction, the temperatures of the ore and flame have been sufficiently equalized so that fusing and sticking of the charge to the lining is rendered entirely improbable. However, if adhesion to the lining should occur it would be near the lower end of the kiln and easily removable by a suitable tool operated through the cleanout door 29 instead of substantially at the center of the kiln so as to be inaccessible from either end, as usually occurs in an up draft kiln. Ordinarily the maximum heat input in the down draft metallizing kiln will be less than in an up draft kiln, further removing the likelihood of adhesion of the charge to the lining.

In an up draft kiln the heating flame must be enriched by the solid carbon in the charge in order that reduction may take place. The attendant reaction is highly endothermic and the escape of the rich gases further represents a considerable loss, as above mentioned. In the down draft process all reactions in the preheating kiln are exothermic and all gases, including those from metallizing, are substantially completely burned. In the metallizing kiln the heat input is reduced to a minimum by utilization of the volatile gases to enrich the heating flame, by using heated air for what little combustion is needed in the metallizing kiln and, when partly reduced sponge iron is formed, by the consequently relatively smaller amount of carbon monoxide required.

As mentioned, a reaction proceeding in the direction of complete combustion, as, for example $C$ plus $O_2$ equals $CO_2$ is an exothermic reaction and gives off heat. Conversely, a reaction proceeding away from complete combustion, as, for example $CO_2$ plus $C$ equals $2CO$ is endothermic and absorbs heat.

The enrichment of the flame in an up draft kiln by carbon or volatile gases is an endothermic reaction. The reduction of iron oxide by solid carbon is a double reaction, the first step $C$ plus $CO_2$ equals $2CO$ being endothermic, and the second step $Fe_3O_4$ plus $4CO$ equals $3Fe$ plus $4CO_2$ being exothermic. The complete reaction, however, is highly endothermic because of the large amount of heat absorbed in the reaction of the carbon dioxide upon solid carbon to produce carbon monoxide gas which is a necessary agent in the reduction process.

Hence, when solid carbon is used as the reducing agent, even after preheating of the constituent materials, a large amount of heat must be supplied continuously throughout the period of reduction. As the formation of carbon monoxide from carbon and carbon dioxide is the reaction which absorbs the relatively great amount of heat during the reduction process, it follows that when partly reduced sponge iron is made, less carbon monoxide, and consequently less heat, will be required in the metallizing kiln than when fully reduced sponge iron is made.

While I have shown and described a present preferred embodiment of the invention, it is to be distinctly understood that the same is not limited thereto, but may be otherwise variously embodied and practiced within the scope of the following claims.

I claim:

1. A process for the reduction of iron ores, comprising advancing together through an inclined rotary kiln furnace a charge of iron ore and carbonaceous material, creating a down draft through said furnace, directly applying a heating flame to the charge in the upper portion of the furnace to raise the charge to a high temperature but below the fusion point, regulating the amount of carbonaceous material to maintain a reducing condition within the furnace and to liberate rich gases therefrom, and utilizing such gases to enrich the heating flame as it passes from the upper to the lower portion of the furnace whereby to prevent the heating flame from oxidizing the carbonaceous material and metallic iron in the charge in the lower portion of the furnace.

2. A process for the beneficiation of banded iron ore, comprising subjecting the ore to a high temperature but below the fusion point under reducing conditions, and forming about the iron strata a shell of metallic iron having considerable strength while at least partially breaking down the gangue strata whereby the gangue strata become softer and weaker than the iron strata so that the gangue strata may be crushed while maintaining the iron strata in substantially uncrushed condition.

ARTHUR J. JONES.